Oct. 9, 1945.     H. C. GRANT, JR     2,386,210
CONTROL HEAD
Filed May 30, 1942     2 Sheets-Sheet 1
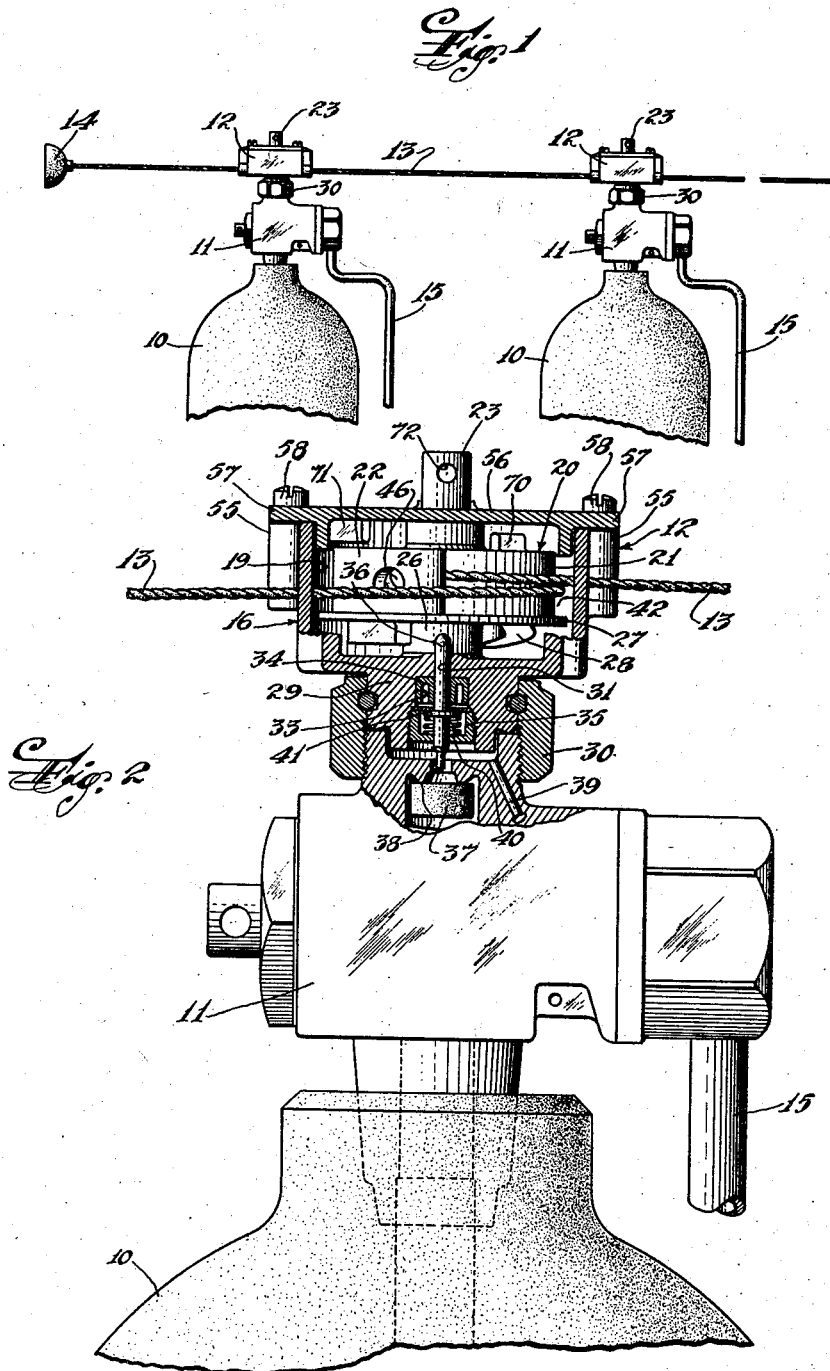
INVENTOR
HARRY C. GRANT, JR.
BY
ATTORNEY

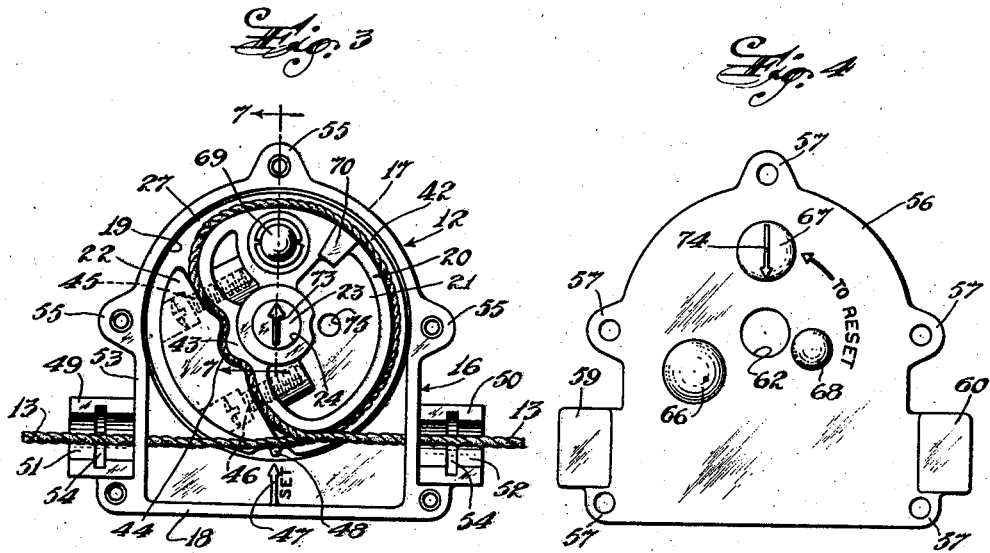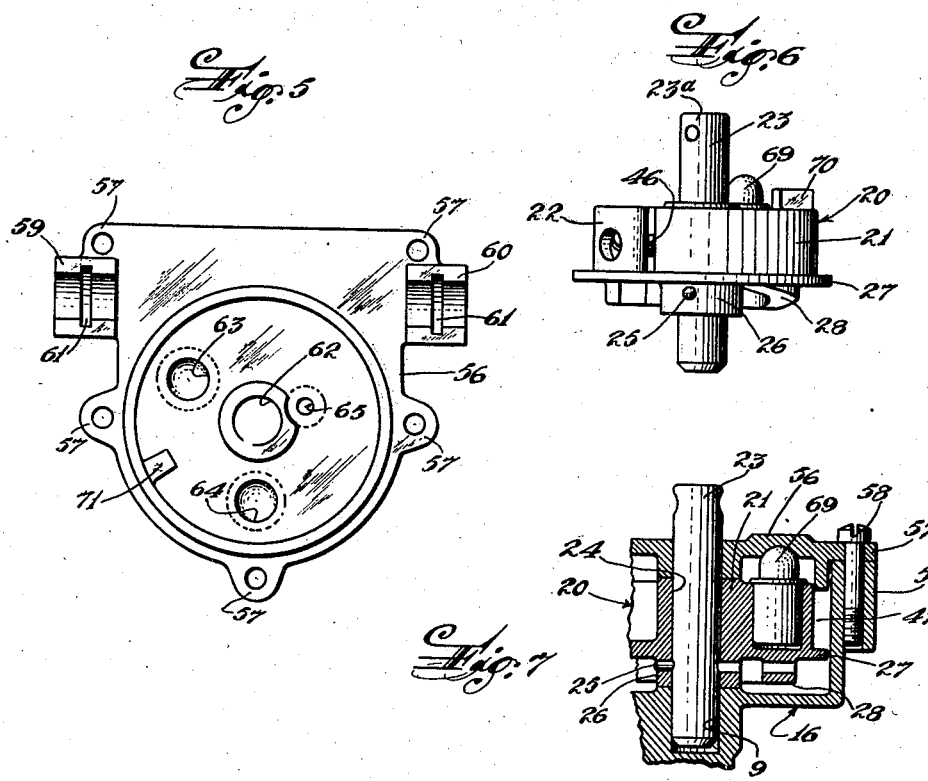

Patented Oct. 9, 1945

2,386,210

UNITED STATES PATENT OFFICE 2,386,210

CONTROL HEAD

Harry C. Grant, Jr., New York, N. Y., assignor to Specialties Development Corporation, Bloomfield, N. J., a corporation of New Jersey Application May 30, 1942, Serial No. 445,202

13 Claims. (Cl. 74—56)

The present invention relates to control devices, and more particularly to a pull cable actuated control head adapted to be used in connection with controlling the release of a fluid medium stored under high pressure.

In systems for releasing or dispensing a high pressure fluid medium such as carbon dioxide used for fire extinguishing or for other purposes, it is customary to provide one or more containers or cylinders for storing the fluid medium having a valve or discharge controlling device for releasing the medium. Suitable valves for this purpose may comprise a spring seated piston operated valve member, the operation of which is adapted to be controlled by a pilot valve which normally is maintained in closed position by the pressure in the cylinder and which may be opened to bleed a portion of the pressure medium in back of the piston of the valve member. The device or control head of the present invention is primarily concerned with controlling the operation of the pilot valve or other means adapted to effect the opening of valves or the like.

Pull cable control heads of this type used heretofore, particularly, when used in multiple cylinder systems, have presented difficulties in that no precise way was available in adjusting the necessary slack of the cable, that accidental discharges took place during the installation of the cable, or that the system failed to operate later because of extraneous cable locking devices employed to prevent accidental discharges which devices were unintentionally left in place.

The present invention aims to overcome the foregoing difficulties by providing an improved pull cable type control head which permits a precise adjustment of the cable slack without the danger of accidental release of the controlled fluid medium, and which does not require any extraneous locking means for the cable which may interfere with the operation of the control head when it is desired.

An object of the present invention is to provide an improved device for controlling the release of a fluid pressure medium, which is simple in construction and is economical to manufacture.

Another object is to provide a device of the foregoing character which is easily installed and is adapted to be connected for simultaneous operation with other similar devices.

Another object is to provide a control device which permits a predetermined adjustment in the slack of the pull cable during the installation thereof.

Another object is to provide a control device which is adapted to be easily reset and wherein the cable assumes a predetermined slack after operation.

Another object is to provide a pull cable operated control head which has safeguards for preventing unintentional operation of the control head.

A further object consists in the construction and arrangement of the parts of the device, whereby the foregoing objects may be attained.

Other and further objects, not specifically enumerated above, will be apparent when described in greater detail in connection with the accompanying drawings, wherein:

Figure 1 illustrates a typical battery of two fluid containers (fragmentally shown), each equipped with a control head in accordance with the present invention.

Figure 2 is a fragmentary sectional view of the control head as used in connection with a fluid release valve mounted on a container.

Figure 3 is a top plan view of the control head with its cover removed.

Figures 4 and 5 are plan views of the outside of the cover of the control head, respectively.

Figure 6 is a view in elevation of the sheave or pulley assembly of the device.

Figure 7 is a fragmentary sectional view taken substantially on the line 7—7 in Figure 3.

Referring first to Figure 1, a pair of cylinders 10 is shown, each cylinder being fitted with a discharge head. Each discharge head comprises a valve or fluid release device 11 threaded into the neck of the cylinder, and a pull cable operated control head 12 mounted on the valve or release device 11. The valve or release device 11 may be of the type comprising a piston operated valve member, the operation of which is adapted to be controlled by a pilot valve. The control head may be actuated remotely by a pull cable 13 which may be provided with a handle or the like 14. Each of the cylinders 10 is adapted to discharge through its valve 12 into a discharge conduit 15 which may be connected into a fluid distribution system (not shown), as may be required.

Referring more particularly to Figures 2, 3, 4, 5, 6 and 7, the control head 12, as shown, comprises a generally cup-shaped housing 16 having a circular portion 17 and a rectangular portion 18 (Figure 4). The circular portion 17 is formed with a circular recess 19 which is adapted to receive a sheave or pulley assembly 20. The pulley assembly comprises a main operating member 21 and a cable clamping member 22, and is mounted for rotation within the circular portion 17 of the housing 16 on a shaft 23, which extends through a bearing aperture 24 in the member 21 and is rotatably supported in the housing in the bearing recess 9 (Figure 7). The shaft 23 is secured to the main operating member 21 by means of a holding pin 25 driven through an annular bearing flange 26 formed on the member 21. The main operating member 21 is formed with a circular plate-like formation 27, which is provided on its lower side with an annular projection forming a wedge-like cam 28 (Figures 2, 6 and 7), the function of which will be described hereinafter.

The housing 16 is formed with a depending projection 29 which is adapted to extend into the valve or release device 11 (Figure 2), and which carries a coupling unit 30 for securing the head to the valve or release device. The depending projection 29 is formed with a passage or bore 31, which, at its lower end, is provided with a portion having an increased diameter to form a recess 33 for housing an annular U-formed sealing gasket 34 and a threaded retaining sleeve or washer 35.

An actuating pin or rod 36 is slidably disposed in the bore 31 and has its lower end extending through the retaining washer 35, and is adapted to engage a pilot valve member 37 to unseat the same upon downward movement of the pin. The pilot valve member 37, which forms a part of the valve or release device 11, is normally held by pressure in the container against a valve seat 38 to close a port 39 through which a portion of the pressure medium in the cylinder 10 may be conducted to actuate a valve means (not shown) of the valve or release device 11. The upper portion of the pin 36 extends through the gasket 34 and projects into the interior of the circular recess 19 of the housing 16, and is there adapted to be engaged by the cam 28. The pin, preferably, is normally maintained in its upper position by a cylindrical helical spring 40 telescoped about the pin and abutting a collar 41 on the pin 36 and disposed in a recessed portion of the washer 35.

In order to rotate the operating member 21 and to advance the cam 28, the pull cable 13 is wrapped completely around the member 21, for which purpose the member 21 and the clamping member 22 are provided with a circumferential surface 42 adapted to receive the cable (Figure 7). The cable is adapted to be locked or clamped to the operating member by means of the clamping member 22 which is shaped so as to form together with the operating member 21 a substantially circular and cylindrical assembly as illustrated (Figures 2, 3, 6). The sides of the members 21 and 22 facing each other are preferably uneven and are so formed as to complement each other, as for example, in the illustration used here, wherein, a projection 43 on one member matches a groove 44 on the other member. Both members 21 and 22 are suitably recessed and threaded to accommodate two screws 45 and 46, by means of which the clamping member may be secured to the operating member. Preferably, one of these screws is disposed in a different plane transverse with respect to the main axis of the device than the other screw, so that the cable, when being passed between the two members, may be passed over one screw and under the other screw, in order to improve the hold of the members 21 and 22 on the cable.

The rectangular portion 18 of the housing is provided with a reference mark 47 (Figure 3) disposed centrally thereof, corresponding to a reference notch or mark 48 which may be provided on the peripheral portion of the plate-like formation 27 of the operating member 21.

Tubular conduit or nipple portions 49 and 50, respectively, extend outwardly from the walls of each of the short sides of the rectangular portion 18 of the housing. The conduit portions 49 and 50, of which only the lower halves are shown in Figure 3, are provided with a bore or passage 51 and 52, respectively, for passing the cable 13 into the housing through corresponding openings in the wall portions 53 thereof. The bores may be formed with suitable grooves 54 for anchoring a pipe or conduit (not shown) adapted to shield and guide the cable.

The cup-shaped housing 16, at its open end, is provided with suitably spaced peripheral projections, lugs or ears 55 for attaching a cover or closure 56 about to be described.

The cover or closure 56 is shaped to fit over the open end of the housing 16 and comprises, similar to the housing, a circular portion and a rectangular portion (Figures 4 and 5). A number of apertured ears or lugs 57 are provided on the closure corresponding in form and location to the lugs or projections 55 on the housing. Screws 58 (Figure 2) may be used to secure the closure 56 detachably to the housing, whereby assembly, inspection and repair of the device is facilitated. The closure is also formed with outlet nipple portions 59 and 60, adapted to form, respectively, the other half of the conduit or nipple portions 49 and 50 on the housing, respectively. Grooves 61 are provided in the nipple portions 59 and 60, corresponding to the grooves 54 on the housing.

The cover is apertured centrally of its circular portion at 62 to permit the shaft 23 to extend therethrough when the control head is assembled (Figures 2 and 7).

It is desirable to prevent accidental rotation of the cam operating member and to provide a certain amount of restraint against rotation thereof while the device is being assembled or reset. Suitable resilient locking or latching means may be utilized for this purpose. For example, as shown in Figures 3, 6 and 7, a latch member 69 having a rounded head may be resiliently mounted in the side of the operating member facing the cover 56. The latch member 69 is urged outwardly from the operating member by spring means (not shown) associated therewith and is adapted to be spring pressed into a recess 64 (Figures 5 and 7) in the cover 56 when the operating member 21 is in its normal position prior to operation. Upon application of a substantial force to the pull cable to rotate the shaft, the latch member is adapted to be forced out of the recess. When the operating member 21 has been rotated about 240° in a clockwise direction (Figure 3) and the pin 36 has been depressed, the latch member 69 is urged into a second recess or well 63 (Figure 5) provided in the cover 56, to retain the cam pulley assembly 20 and its cam 28 in its operated position.

Projections or bosses 66 and 67 corresponding to the recesses 63 and 64 are formed on the outside of the cover.

Excessive rotation of the cam operating member may be prevented by providing a stop 70 (Figures 2 and 6) on the side of operating member 21 facing the cover, which is adapted to engage a stop 71 (Figures 2 and 5) disposed on the inside of the cover 56 to prevent further rotation of the pulley assembly 20 when its cam 28 has been rotated into its operated position.

Resetting of the device may be effected by rotating the shaft and the operating member in a counterclockwise direction by pulling the cable nearest the nipple portion 50, or by turning the shaft by means of a rod-like member adapted to be inserted in an aperture 72 (Figure 2) extending through the free end of the shaft 23 until the latch member 69 snaps into the recess 64. Excessive rotation, in this case, too, is prevented by the coaction with respect to one another of stops 70 and 71. To facilitate the resetting operation, the cover and the shaft are provided with visual indicating means, such as reference marks 73 and 74 (Figures 3 and 4).

When it is desired to install one or more of the pull cable control heads, the housing 16 is secured to the valve or release device 11, and the sheave or pulley assembly 20 taken out of the housing. The cover is then turned over and upside down and is secured to the housing in this position, that is, the inside facing up and the lower part in the place of the upper portion.

The sheave assembly is now mounted on the cover by inserting the shaft into the aperture 62. The pulley or sheave-like member is rotated until an aperture 75, provided in the body of the actuating member, as seen in Figure 3, coincides with a threaded recess 65 formed on the inside of the cover 56 (Figure 5), adapted to receive a screw. A boss 68 (Figure 4), corresponding to the recess 65 is formed on the outside of the cover. When the sheave assembly is lined up in this manner a suitable screw is inserted into the aperture 75 and is threaded into the recess 65, whereby the sheave assembly will be held in this position with respect to the housing and the cover. This position of the pulley assembly corresponds to that assumed by it before actuation or rotation thereof has taken place and when it is ready to be operated.

The loose end of the cable is now introduced into the housing through the conduit nipple portion 49, brought over to the other side of the housing and wrapped around the periphery of the operating member 21 in a counterclockwise direction and finally brought out through the conduit nipple portion 50. The cable clamping member 22 is then secured into place by means of the screws 45 and 46, the cable being disposed below the screw 45 and above the screw 46.

The screw (not shown), in the aperture 75, as above mentioned, and holding the pulley assembly 20 in position with respect to the housing 16, is now removed and the pulley assembly is lifted out of its support in the upturned cover and the cover slid out from under the pulley. Thereupon, the pulley assembly is lowered into the circular recess 19 of the housing 16 and the lower end of the shaft 23 is inserted into the bearing recess 9. Before the cover is secured in place, any necessary slight adjustments may be made in the relative rotative position of the pulley in order to align the reference marks 47 and 48, and guiding or shielding conduits (not shown) for the cable, if desired, may be put in place in the conduit nipple portions of the housing. The control head is now ready for operation.

It will be seen, that, whether a single one or a plurality of control heads are to be operated from one cable, a very accurate and proper positioning of the various pulleys with respect to the cable, as well as the correct slack in the cable may be attained by the procedure outlined hereabove.

It will be also apparent that upon a pull of the cable, and upon the consequent rotation of the pulley assembly and its cam in a clockwise direction, the pin 36 will be depressed to unseat the pilot valve member 37, whereby an actuation of the main valve is effected by the fluid pressure medium in the container 10.

It will be also apparent that any other controllable member or means may take the place of the pilot valve member, and that the control head may be employed in connection with devices other than the one illustrated.

From the foregoing description, it will be seen that the present invention provides a simple, inexpensive, improved control device which is adapted to be operated locally and remotely, singly and in series with other similar control heads, and which achieves the objects set forth hereinbefore. The device is rugged in construction and can readily withstand any rough usage to which it may be subjected.

While my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In a device of the class described, a removable sheave assembly adapted to be rotated by a pull cable, comprising a shaft, an operating member formed with an uneven side and about which a cable is adapted to be wrapped, said operating member being mounted on said shaft, a cable clamping member removably secured to said uneven side of said operating member having an uneven side adapted to substantially match said first named uneven side, and members for removably securing said clamping member to seat main operating member whereby the cable is adapted to be securely held in clamping relation between said two members.

2. In a device of the class described having a housing, a sheave-like member rotatably disposed in said housing adapted to be rotated by a cable wrapped around it, a cover member for said housing, latch means on one of said members, and latch means receiving means on the other of said members adapted to prevent undesired rotation of said sheave-like member from its non-operated position; the combination for positioning said sheave-like member with respect to said housing and said cover member while a cable is being wrapped around it, comprising the housing, the cover member secured to the housing upside down and inside out, the sheave-like member rotatably mounted on said cover member, and means on said sheave-like member and said cover member for correctly locating the relative rotative position of the sheave-like member with respect to the housing and the cover member for its normal non-operated position while the cable is being wrapped around it, whereby upon the cover member being removed from between the housing and the sheave-like member and upon the sheave-like member being inserted into the housing without being rotated, and upon the cover member being placed over the housing in its normal position, the sheave-like member is correctly positioned for the latch means to cooperate properly with the latch receiving means.

3. In a device of the class described, the combination comprising a housing provided with opposed inlet and outlet means; a shaft, one end of which is adapted to be rotatably mounted in said housing; a sheave-like member on said shaft adapted to be rotatably disposed in said housing; a cable wrapped around said sheave-like member and having ends adapted to extend through said inlet and outlet means respectively; a cover member for said housing having bearing means for rotatably receiving the other end of said shaft; means for attaching said cover member to said housing in inverted position and in a position diametrically opposed to its position when normally secured to said housing, said cover member when in its inverted position being adapted to support said sheave-like member in a position simulating a predetermined position of said sheave-like member with respect to said housing when said sheave-like member is normally disposed in said housing; means on said sheave-like member and said cover member for locating said predetermined position and for maintaining said sheave-like member in said position; whereby said cable may be wrapped around said sheave-like member and the slack thereof between the inlet and outlet means may be adjusted while said sheave-like member is supported on said cover member, and whereby said cover member thereafter may be removed from said housing and placed thereon in its normal position with said sheave-like member rotatably disposed in said housing in its predetermined position.

4. In a device of the class described, the combination comprising a housing provided with opposed inlet and outlet means; a shaft, one end of which is adapted to be rotatably mounted in said housing; a sheave-like member on said shaft adapted to be rotatably disposed in said housing; a cable wrapped around said sheave-like member and having ends adapted to extend through said inlet and outlet means respectively; means for securing said cable to said sheave-like member; a cover member for said housing having bearing means for rotatably receiving the other end of said shaft; latch means on one of said members, and latch means receiving means on the other of said members for positioning said sheave-like member in a predetermined position with respect to said cover member; means for attaching said cover member to said housing in inverted position and in a position diametrically opposed to its position when normally secured to said housing, said cover member when in its inverted position being adapted to support said sheave-like member in a position simulating a predetermined position of said sheave-like member with respect to said housing when said sheave-like member is normally disposed in said housing; and means on said sheave-like member and said cover member for locating said predetermined position and for maintaining said sheave-like member in said position; whereby said cable may be wrapped around said sheave-like member and secured thereto and the slack thereof between the inlet and outlet means may be adjusted while said sheave-like member is supported on said cover member, and whereby said cover member thereafter may be removed from said housing and placed thereon in its normal position with said sheave-like member rotatably disposed in said housing in its predetermined position.

5. In a device of the class described, the combination comprising a housing provided with opposed inlet and outlet means; a shaft, one end of which is adapted to be rotatably mounted in said housing; a sheave-like member on said shaft adapted to be rotatably disposed in said housing, a cable wrapped around said sheave-like member and having ends adapted to extend through said inlet and outlet means respectively; means for securing said cable to said sheave-like member; a cover member for said housing having bearing means for rotatably receiving the other end of said shaft; latch means on one of said members and latch means receiving means on the other of said members for rotatably positioning said sheave-like member in a predetermined rotary position with respect to said cover member and said housing; means for attaching said cover member to said housing in inverted position and in a position diametrically opposed to its position when normally secured to said housing, said cover member when in its inverted position being adapted to support said sheave-like member in a rotary position simulating said predetermined rotary position of said sheave-like member with respect to said cover member and said housing when said sheave-like member is normally disposed in said housing; means on said sheave-like member and said cover member for locating said predetermined rotary position and for maintaining said sheave-like member in said position; whereby said cable may be wrapped around said sheave-like member and secured thereto and the slack thereof between the inlet and outlet means may be adjusted while said sheave-like member is supported on said cover member, and whereby said cover member thereafter may be removed from said housing and placed thereon in its normal position with said sheave-like member rotatably disposed in said housing in its predetermined rotary position.

6. In a device of the class described a removable sheave assembly adapted to be rotated by a pull cable, comprising a shaft, a partly circularly formed operating member on said shaft formed with a substantially circular cable supporting flange and formed with a non-circular chord-like uneven side and a peripheral surface about which a cable is adapted to be wrapped, a cable clamping member removably secured to said uneven side of said operating member being formed with an uneven side adapted to substantially match said first named uneven side, said clamping member having a peripheral surface disposed inwardly of said cable supporting flange and adapted to cooperate with the surface of said operating means to provide an annular surface about which a cable is adapted to be wrapped, and means for removably securing said clamping member to said operating member.

7. In a device of the class described, the combination comprising a housing, a shaft, one end of which is adapted to be rotatably mounted in said housing; a sheave-like member on said shaft adapted to be rotably disposed in said housing; a cable wrapped around said sheave-like member; a cover member for said housing having bearing means for rotatably receiving the other end of said shaft; means for attaching said cover member to said housing in inverted position and in a position diametrically opposed to its position when normally secured to said housing, said cover member when in its inverted position being adapted to support said sheave-like member in a position simulating a predetermined position of said sheave-like member with respect to said housing when said sheave-like member is normally disposed in said housing; means on said sheave-like member and said cover member for locating said predetermined position; whereby said cover member thereafter may be removed from said housing and placed thereon in its normal position with said sheave-like member rotatably disposed in said housing in its predetermined position.

8. In a device of the class described, the combination comprising a housing, a shaft, one end of which is adapted to be rotatably mounted in said housing; a sheave-like member on said shaft adapted to be rotatably disposed in said housing; a cable wrapped around said sheave-like member; a cover member for said housing having bearing means for rotatably receiving the other end of said shaft; means for attaching said cover member to said housing in inverted position and in a position diametrically opposed to its position when normally secured to said housing, said cover member when in its inverted position being adapted to support said sheave-like member in a position simulating a predetermined position of said sheave-like member with respect to said housing when said sheave-like member is normally disposed in said housing; means on said sheave-like member and said cover member for locating said predetermined position and for maintaining said sheave-like member in said position; whereby said cover member thereafter may be removed from said housing and placed thereon in its normal position with said sheave-like member rotatably disposed in said housing in its predetermined position.

9. In a device of the class described, the combination comprising a housing provided with opposed inlet and outlet means; a shaft, one end of which is adapted to be rotatably mounted in said housing; a sheave-like member on said shaft adapted to be rotatably disposed in said housing; a cable wrapped around said sheave-like member and having ends adapted to extend through said inlet and outlet means respectively; a cover member for said housing having bearing means for rotatably receiving the other end of said shafts; means for attaching said cover member to said housing in inverted position and in a position diametrically opposed to its position when normally secured to said housing, said cover member when in its inverted position being adapted to support said sheave-like member in a position simulating a predetermined position of said sheave-like member with respect to said housing when said sheave-like member is normally disposed in said housing; means on said sheave-like member and said cover member for locating said predetermined position; whereby said cable may be wrapped around said sheave-like member and the slack thereof between the inlet and outlet means may be adjusted while said sheave-like member is supported on said cover member, and whereby said cover member thereafter may be removed from said housing and placed thereon in its normal position with said sheave-like member rotatably disposed in said housing in its predetermined position.

10. In a replaceable control head for a fluid release device, a housing, a pull-cable operated sheave-like member rotatably mounted in the housing, a cam carried on a face adjacent the periphery of said member, an actuating element slidably mounted in said housing and adapted to extend axially into the release device to which said head is attached, said element being disposed parallel and in spaced relation to the axis of said sheave-like member to dispose said element in a path of said cam about said axis for operation by the latter upon rotation of said sheave-like member.

11. In a replaceable control head for a fluid release device, a housing, a shaft mounted in said housing, a pull-cable operated sheave-like member mounted on said shaft for rotation relative to said housing, a cam carried on a face adjacent the periphery of said member, an actuating pin slidably mounted parallel and in spaced relation to said shaft, said pin having one end adapted to extend axially into the release device to which said head is attached and the opposite end disposed in a path of said cam about the axis of said sheave-like member for operation by the latter upon rotation thereof.

12. In a fluid release device, a housing including body and cover portions, rotatable means having cam means thereon in the housing, fluid release control means movable by said cam means, and a plurality of sets of indicating means, one of which has elements on said rotatable means and on said body portion for indicating a position of said rotatable means relative to said body portion when said cover portion is removed, and another of which has elements on said rotatable means and on said cover portion for indicating a position of said rotatable means relative to said housing when said cover portion is attached to said body portion.

13. In a fluid release device, a housing including body and cover portions, rotatable means having cam means thereon in the housing, fluid release control means movable by said cam means, and means, including means on said rotatable means and means on said body portion and means on said cover portion, for indicating the position of said rotatable means relative to a portion of said housing when said cover portion is on said body portion and when said cover portion is removed from said body portion.

HARRY C. GRANT, Jr.